P. FISCHER.

Assignor of one-half interest to H. LANGE, Jr.

MANUFACTURE OF GAITERS, BOOTS AND SHOES.

Reissued May 1, 1877.

No. 7,646.

Attest:

Alex Scott

Fred C. Higgins.

Inventor:

Philipp Fischer by A. J. Fields

Attorney.

UNITED STATES PATENT OFFICE

PHILIPP FISCHER, OF NEW YORK, N. Y., ASSIGNOR OF ONE-HALF INTEREST TO HENRY LANGE, JR.

IMPROVEMENT IN THE MANUFACTURE OF GAITERS, BOOTS, AND SHOES.

Specification forming part of Letters Patent No. 179,779, dated July 11, 1876; reissue No. 7,646, dated May 1, 1877; application filed April 23, 1877.

*To all whom it may concern:*

Be it known that I, PHILIPP FISCHER, of New York, in the county and State of New York, have invented certain new and useful Improvements in Gaiters, Boots, or Shoes, of which the following is a specification:

This invention relates to an improvement in that class of gaiters, boots, or shoes in which the quarter, the vamp, the leg, and the button-piece are all formed out of one and the same piece of leather or other material, and which have but a single seam. In such gaiters, boots, or shoes the patterns have usually been cut out so that the portion to form the button-piece was situated on the same side with the portion to form the vamp, and in the finished gaiter, boot, or shoe the seam is situated on the outside of the shoe.

By this method of cutting out the pattern it is rendered difficult to shape or crimp the button-piece, and the seam in the finished shoe extends over a tender portion of the foot, where it is liable to produce irritation.

My improvement consists in a gaiter, boot, or shoe made from one piece of leather or other material, and having its seam on the inside, while the button-piece is on the outside, whereby the appearance and convenience for wear of the shoe are materially improved.

Figure 1:
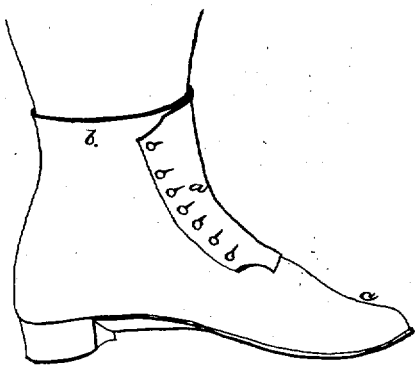
Figure 2:
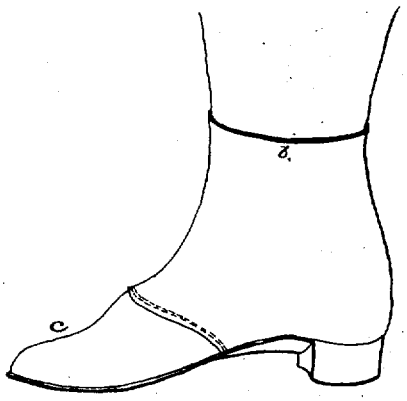
Figure 3:
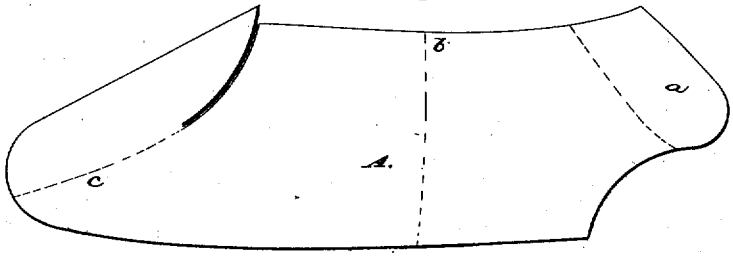

In the drawing, Figure 1 represents an outside view of the gaiter, boot, or shoe. Fig. 2 is an inside view of the same. Fig. 3 is a plan of the pattern which is used for the manufacture of gaiters, boots, or shoes.

Similar letters of reference indicate corresponding parts in all the figures.

In this drawing, the letter A designates the pattern which is used in the manufacture of this class of boots or shoes. In this pattern the part *c* is intended to form the vamp, the part *b* the leg, and the part *a* the button-piece. By referring to Fig. 3 of the drawing it will be seen that button-piece *a* is situated on the side opposite to the vamp *c*, as shown by dotted lines, and consequently on one end of the pattern. By arranging the button-piece in this position I am enabled to cut the same so that it requires but very little crimping, and that, for the purpose of crimping, a small excess of material can be left to afford a hold for the crimping-tools; and, furthermore, when my gaiter is finished, the button-piece is situated on the outside, as shown in Fig. 1, while the seam *d* is situated on the inside, and extends over the soft hollow portion of the foot, where it is least liable to produce irritation.

By these means I am enabled to produce a neat and highly convenient gaiter, boot, or shoe with economy in labor.

What I claim, and desire to secure by Letters Patent, is—

As an improved article of manufacture, a gaiter, boot, or shoe, the quarter, the vamp, the leg, and the button-piece of which are made out of one piece, said button-piece being formed from that portion of the material opposite the vamp, so that the finished gaiter, boot, or shoe has but a single seam situated on the opposite side to that occupied by the button-piece, as shown and described.

In testimony that I claim the foregoing I have hereunto set my hand.

PHILIPP FISCHER.

Witnesses:
A. J. FALLS,
WM. G. MOORE.